United States Patent [19]
Army, Jr. et al.

[11] Patent Number: 5,784,894
[45] Date of Patent: Jul. 28, 1998

[54] INTEGRAL BYPASS VALVES AND AIR CYCLE MACHINE

[75] Inventors: Donald E. Army, Jr., Springfield, Mass.; Christopher McAuliffe, Windsor; Michael D. Greenberg, Bloomfield, both of Conn.

[73] Assignee: United Technologies Corporation, Windsor Locks, Conn.

[21] Appl. No.: 768,385

[22] Filed: Dec. 18, 1996

[51] Int. Cl.⁶ ............................................. F25D 9/00
[52] U.S. Cl. .................................... 62/402; 62/87
[58] Field of Search ........................ 62/87, 401, 402

[56] References Cited

U.S. PATENT DOCUMENTS

| | | | |
|---|---|---|---|
| 4,312,191 | 1/1982 | Biagini | 62/402 |
| 4,771,612 | 9/1988 | Kurikka | 62/402 |
| 5,056,335 | 10/1991 | Rennenger et al. | 62/402 |
| 5,133,194 | 7/1992 | Army, Jr. et al. | 62/401 |
| 5,249,934 | 10/1993 | Merritt et al. | 62/402 X |
| 5,309,724 | 5/1994 | Schreiber et al. | 62/87 |
| 5,309,735 | 5/1994 | Maher, Jr. et al. | 62/402 |
| 5,311,749 | 5/1994 | McAuliffe et al. | 62/402 |
| 5,461,882 | 10/1995 | Zywiak | 62/401 |
| 5,553,461 | 9/1996 | Hitzigrath et al. | 62/402 X |
| 5,568,731 | 10/1996 | Reali | 62/87 |

*Primary Examiner*—Christopher Kilner

[57] ABSTRACT

A bypass valve for use with a component of an air cycle machine is disclosed, wherein the component includes a conditioning member, an inlet and an outlet. The air cycle machine includes a component housing portion. The component housing portion defines a first volume and includes a port for receiving the valve. The valve comprises a housing for mating with the port, an air entrance opening adapted to be positioned adjacent the inlet, an air exit opening adapted to be positioned adjacent the outlet, and a valve portion for controlling at least one of temperature and pressure of the air at the outlet. Control is accomplished by permitting air flow from the entrance opening to the exit opening and bypassing the conditioning member and by prohibiting air flow from the entrance opening to the exit opening for directing substantially all of the air into the conditioning member. The valve portion is substantially entirely positioned inside of the first volume in the port. An air cycle system using the bypass valve is also disclosed.

44 Claims, 7 Drawing Sheets

INTEGRAL BYPASS VALVES AND AIR CYCLE MACHINE

TECHNICAL FIELD

This invention is directed to air conditioning cooling packs and air cycle machines thereof (ACM), and more particularly, to ACM component bypass valves for use in bypassing air around components of an ACM such as the turbine and compressor, for assisting in controlling temperature and/or pressures at the ACM component outlet.

BACKGROUND ART

Air cycle machines are typically used to condition air in human occupied enclosures and/or vehicle cabins. The typical air cycle machine includes at least one compressor portion having an inlet and an outlet, a fan and typically at least one turbine portion for receiving compressed air from the compressor portion, expanding and cooling the same, and thereby providing cooled conditioned air to the cabins in addition to extracting energy for driving the compressor portion and fan. Under normal operation of an air cycle machine, low pressure air enters the compressor inlet, is compressed by a compressor, and then exhausted at higher pressure through a compressor outlet, and said compressed air is subsequently directed to the turbine.

Depending upon the temperature of the compressed air at this point in the cycle, it may be necessary to adjust the temperature of the air at the output of the turbine. In this scenario, air is taken from the outlet of the compressor and forced to bypass expansion in the turbine, and is subsequently directed unexpanded to the turbine outlet where it is mixed with cooled, turbine processed air. Current turbine bypass systems include exteriorly ducted air passageways, as shown in FIGS. 1A and 1B, which are designated as prior art.

Referring now to FIG. 1A, a typical radial turbine bypass system is exteriorly positioned and comprises duct 1, for bypassing the air from the compressor outlet to the turbine outlet 2, a flex coupling 3 and a V-band coupling 4 for connecting the inlet duct to the turbine housing 5. FIG. 1B is indicative of a similar system used for an ACM with an axial turbine bypass.

Referring to FIG. 1C, a typical compressor bypass includes a primary outlet duct pullout 1, a V band coupling 2, a bypass duct 3, a flex coupling 4, and a secondary inlet pullout duct 5, all extending exteriorly from the housing 6 of ACM.

As is obvious from FIGS. 1A, 1B, and 1C, current bypass technology requires substantial exterior space relative to the actual volume occupied by the main part of the ACM housing. That is, due to the bulk of the elements required of the current bypass systems, the actual volume required to accommodate the same substantially exceeds the actual volume of the main housing of the air cycle machine, excluding the bypass. Accordingly, in situations where space and weight is at a minimum, such as in aircraft and other space and weight conscious vehicles, using an ACM having a component bypass system such as those shown in FIGS. 1A, 1B and 1C are highly undesirable.

The prior art is replete with bypass systems wherein the actual bypass loop is positioned external of the ACM housing, thereby substantially increasing the volume of space occupied by the entire system. Such devices are shown in U.S. Pat. No. 4,086,633 to Warner, disclosing an environmental control condensing system using a bypass valve 72 which allows fresh airflow to bypass turbine 24; U.S. Pat. No. 4,430,867 to Warner, disclosing an air cycle refrigeration system using a valve 125 for bypassing a portion of a compressor inlet of compressor inlet air away from compressor 53; U.S. Pat. No. 5,056,335 to Renninger et al disclosing an auxiliary refrigerated air system having a bypass loop 55 for causing a portion of air to bypass the input of the turbine, after exiting the compressor, and go directly to the output of the first turbine. Additional patents which include bypass loops of the external variety include U.S. Pat. No. 4,963,174, U.S. Pat. No. 4,334,411, U.S. Pat. No. 4,550,573, U.S. Pat. No. 4,374,469, and U.S. Pat. No. 3,699,777.

Another turbine bypass system is shown in U.S. Pat. No. 4,445,815 to Fortmann which is directed to the temperature regulation of air cycle refrigeration systems. This system is specifically designed for use in short term cruise missile deployment for cooling the avionics system thereof. In this system, air is bypassed around the turbine for mixture with the chilled air of the turbine exhaust to achieve a desired temperature of the air at the turbine exhaust, for cooling the avionics system. A bimetallic temperature regulating valve is employed in a bypass line which senses temperature and in response to the sensed temperature at the inlet of the apparatus to be cooled, a bimetallic element of the valve flexes in response to changes in the temperature of inlet air entering the avionics. That is, the flexure of the member adjusts the radius and circumference of the valve, thereby selectively opening and closing bypass ports for bypassing the turbine and mixing the bypass air with the exhaust air to regulate the temperature thereof. The mechanism of this patent is integral to the turbine portion housing, and accordingly, is not easily accessible for maintenance, removal, replacement, or other reasons which may arise for access. That is, since the system is, as a whole, directed to short term usage on a cruise missile having a very short life expectancy, the device provides no convenient means for its access, removal and/or repair. In addition, due to the bimetallic element of the system, the bypass options are few and substantially inflexible, thereby making control over the system very difficult. This system would not be variable enough for efficient usage with different flight situations which may arise in long term flight on a vehicle such as a passenger aircraft.

There exists a need, therefore, for a substantially internally positioned ACM component bypass system for use with an air cycle machine for an aircraft or the like, which provides system bypass with substantial flexibility with regard to access, responsiveness to varying conditions, and the minimization of volume occupation of cooling.

DISCLOSURE OF INVENTION

A primary object of this invention is to provide an ACM component bypass system for use with an air cycle machine which is substantially internally positioned within the air cycle machine and is easily accessible for removal, adjustment, replacement, maintenance, or for other purposes which may arise.

Another object of this invention is to provide at least one of a turbine and compressor bypass system which substantially eliminates the use of exterior interconnecting ducts, clamps, and seals, associated with current bypass systems, and which is easily accessible for removal from the air cycle machine.

Still another object of this invention is to provide at least one of a turbine and compressor bypass system which does not disrupt the aerodynamics of the air cycle machine.

Yet another object of this invention is to provide at least one of a turbine and compressor bypass system in the form of a substantially internally positioned bypass valve so as to maintain the volume of space occupied by the air cycle machine at substantially the volume of the main housing of the air cycle machine.

A further object of this invention is to provide at least one of a turbine and compressor bypass system in the form of a substantially internally positioned bypass valve, which system is easily removable and replaceable as a Line Replaceable Unit (LRU).

The objects and advantages set forth herein are achieved by the bypass valve and air cycle system of the present invention. A bypass valve for use with a component of an air cycle machine is disclosed, wherein the component includes a conditioning member, an inlet and an outlet. The air cycle machine includes a component housing portion. The component housing portion defines a first volume and includes a port for receiving the valve. The valve comprises a housing for mating with the port, an air entrance opening adapted to be positioned adjacent the inlet, an air exit opening adapted to be positioned adjacent the outlet, and a valve portion for controlling at least one of temperature and pressure of the air at the outlet. Control is accomplished by permitting air flow from the entrance opening to the exit opening and bypassing the conditioning member and by prohibiting air flow from the entrance opening to the exit opening for directing substantially all of the air into the conditioning member. The valve portion is substantially entirely positioned inside of the first volume, in the port.

An improved air cycle system for further achieving the objects and advantages set forth herein is for use in conditioning air designated for use in an occupied enclosure. The system comprises a compressor system including an air compressor, an air source inlet, a compressed air outlet and a compressor housing portion. The system also includes a turbine system including turbine, a turbine inlet, and a turbine outlet, wherein compressed air is fed from the compressed air outlet to the turbine inlet for expansion and cooling for use in driving the compressor and supplying conditioned air to the enclosure. A housing is also provided which includes a compressor housing portion defining a first internal volume and a turbine housing portion defining a second internal volume. The system further includes a bypass valve for use with at least one of the turbine system and the compressor system. The bypass valve comprises a housing for mating with at least one of the turbine housing portion and the compressor housing portion, an air entrance opening adjacent at least one of the turbine and air source inlets, an air exit opening adjacent at least one of the turbine and compressed air outlets, and a valve portion. The valve portion is for at least one of controlling temperature and pressure of the air at least one of the turbine outlet and air outlet by permitting air flow from the air entrance opening to the air exit opening for bypassing at least one of the turbine and the compressor, wherein the valve portion is positioned substantially entirely in at least one of the first and second internal volumes.

BEST MODES FOR CARRYING OUT THE INVENTION

Figure 2:
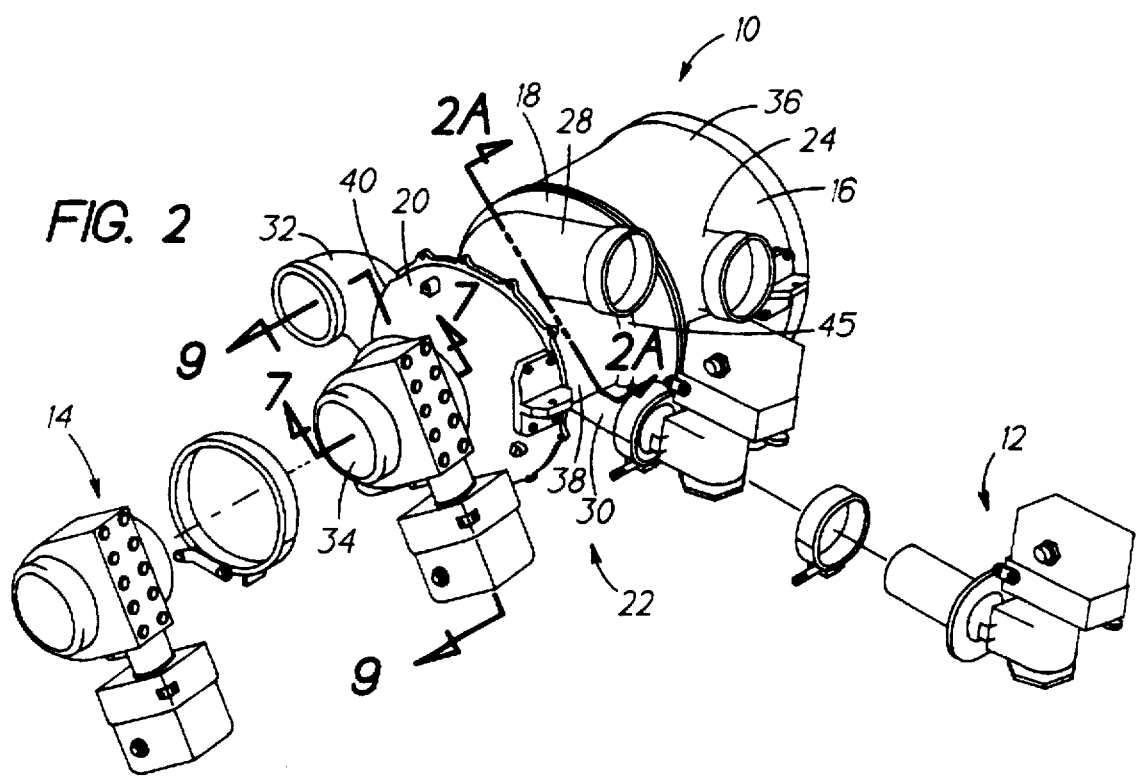
FIG. 2 is a perspective and partial assembly view of the turbine bypass system of the present invention, in position for assembly and assembled with an air cycle machine including a radial and axial bypass valve.

Referring now to the drawings in detail, there is shown in FIG. 2 a perspective view of an air cycle machine 10 including a radial turbine bypass valve, designated generally as 12, and an axial turbine bypass valve, designated generally as 14. The components of air cycle machine 10 include air conditioning members in the form of a compressor system 16, a first stage turbine system 18, a second stage turbine system 20, and also, an air cycle machine housing 22. Compressor system 16 is discussed in more detail below. First stage turbine system 18 includes first turbine inlet 28 and a first bypass port 30. Second stage turbine system 20 includes second turbine inlet 32 and a second turbine bypass port 34. Housing 22 includes compressor portion housing 36, first stage turbine portion housing 38, and second stage turbine portion housing 40, each defining an internal volume.

Figure 2A:
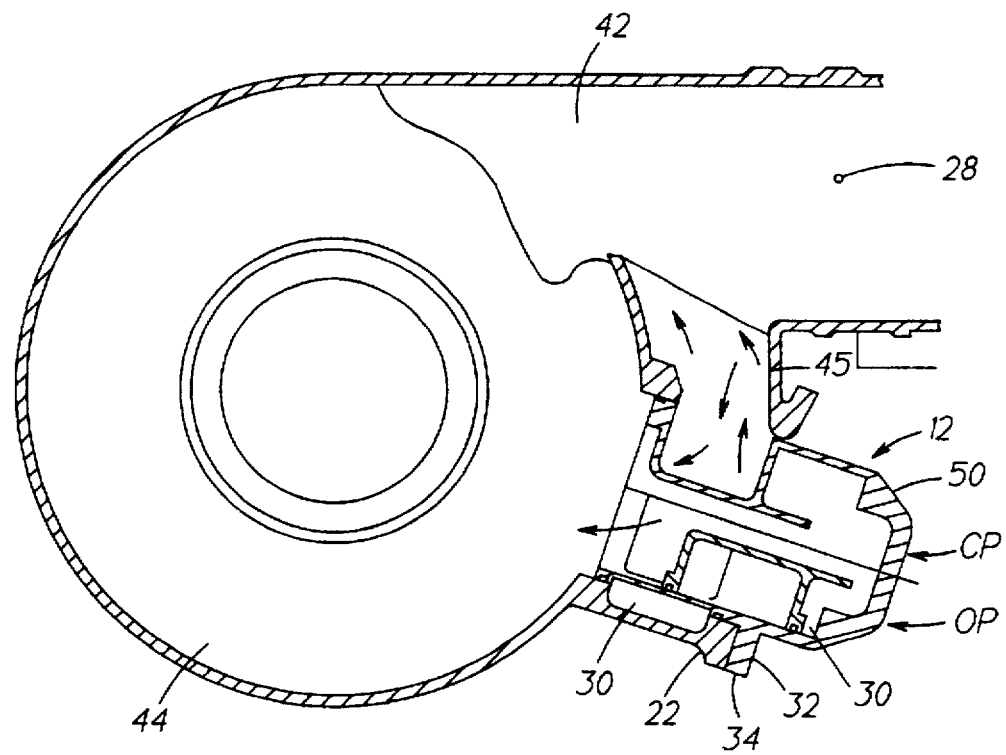
FIG. 2A is a partially cross-sectional view of a turbine inlet plenum of the air cycle machine shown in FIG. 2, taken along line 2A—2A, with the radial embodiment of the turbine bypass system installed.

Referring now to FIG. 2A, radial valve 12 is shown positioned adjacent the inlet plenum 42 in first stage turbine inlet 28, in valve receiving bypass port 30, for use in bypassing air flow from inlet 28 directly to outlet plenum 44. First stage turbine housing portion 38 includes an annular channel 45 on the outside thereof, which defines a cavity extending into each of inlet 28 and bypass port 30, and fluidically connecting them. In the closed position, designated CP, as shown in the top half of turbine radial valve 12, air flow is substantially blocked and no bypass is achieved, as indicated by the multi-directional arrows. In the lower half, valve 12 is shown in the open position, designated OP, and air bypass is shown as achieved from the turbine inlet plenum 42 to the outlet plenum 44, indicated by the unidirectional arrows.

Figure 3:
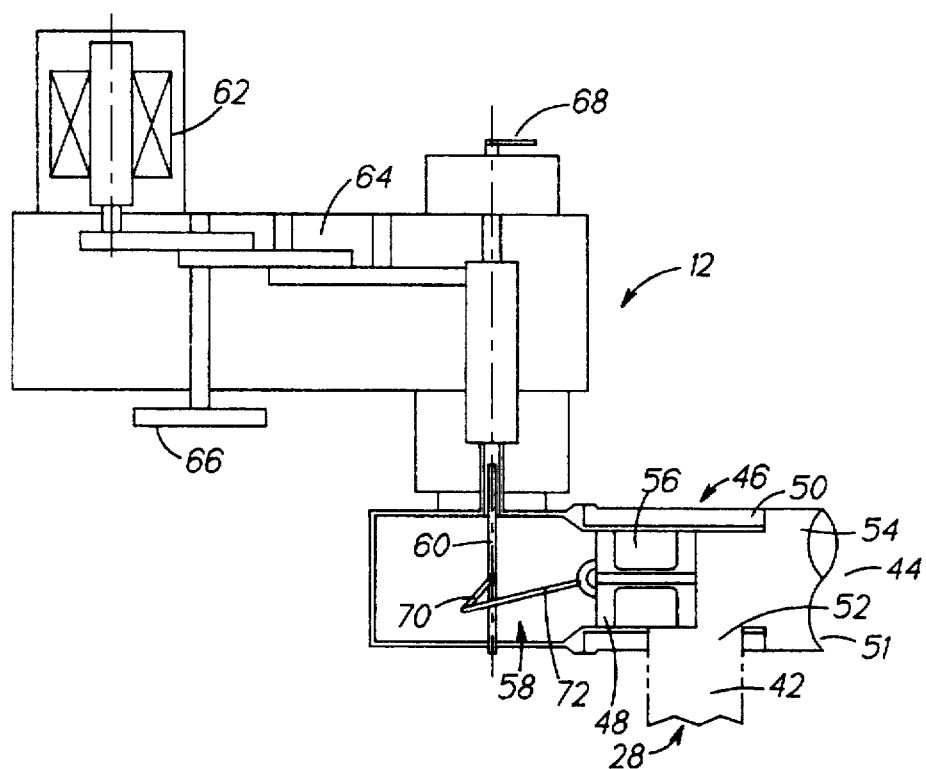
FIG. 3 is a functional schematic of the radial turbine bypass valve used in the systems of FIGS. 2 and 2A, in accordance with the principles of the present invention.
Figure 4:
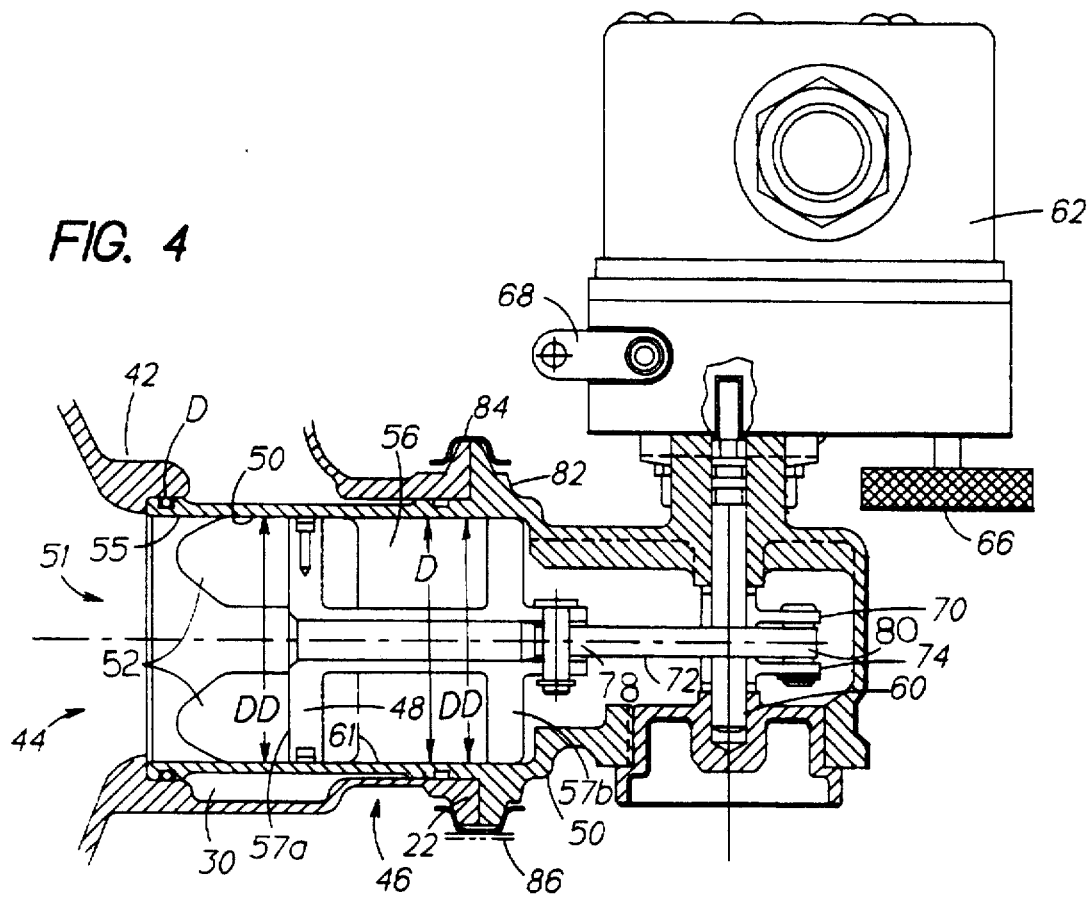
FIG. 4 is a side, cross-sectional view of the first embodiment of the turbine bypass valve system.
Figure 5:
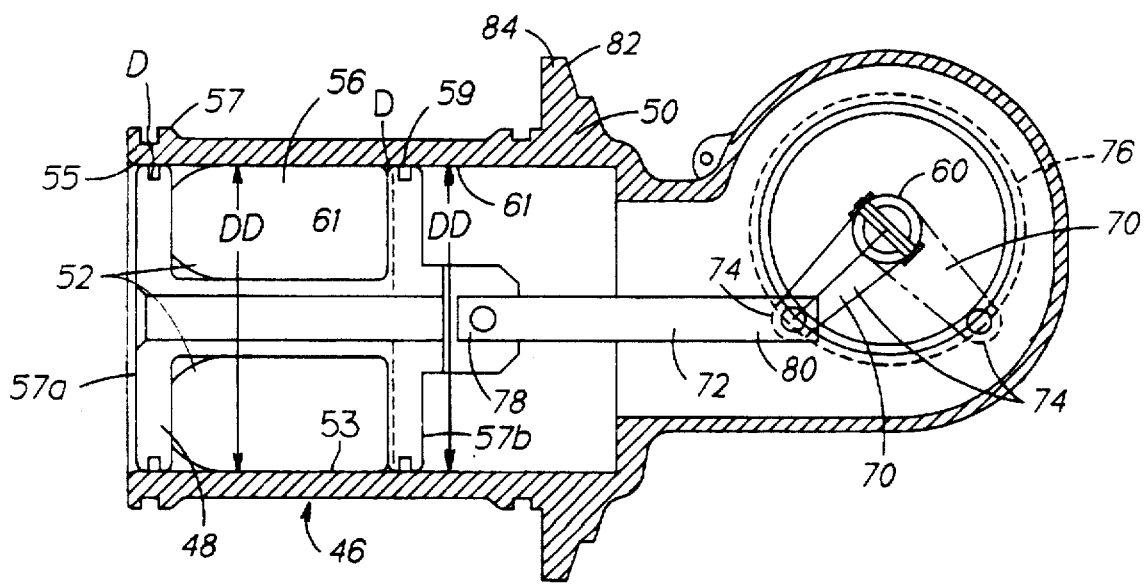
FIG. 5 is a top, cross-sectional view of the turbine bypass valve shown in FIG. 4.
Figure 5A:
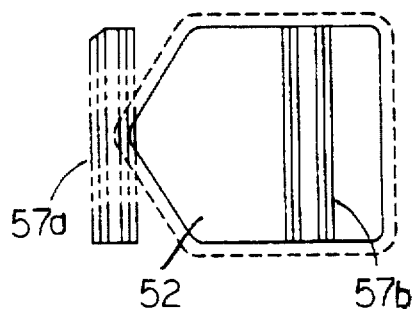
FIG. 5A is a simplified view of tapered air flow openings and closure thereof via a piston associated with the bypass valve of FIG. 5.

Referring now to FIGS. 3–5, the elements of the radial turbine bypass valve 12 are described in detail. Radial turbine bypass valve 12 includes a valve portion 46 in the form of a piston 48 reciprocal in a housing 50. Housing 50 includes at least one and preferably a plurality of entrance openings 52 which fluidically connects housing 50 with inlet plenum 42. Entrance openings 52 are tapered, as shown in FIGS. 5 and 5A, from one end to the other such that as piston 48 moves toward outlet plenum 44 and the closed position shown in FIG. 2A, openings 52 are gradually decreased in size and cut off from air flow. This tapered design prevents high frequency noises or whistling which results in closing non-tapered, i.e. rectangular openings, due to the formation of a very narrow or thin opening during closure. Accordingly, air flowing from first stage turbine inlet 28 through channel 45 is free to flow toward openings 52. Housing 50 defines an enclosed portion 54 having an exit opening 51 which is in fluid communication with outlet plenum 44. Accordingly, with valve member 46 in the open position as shown in the bottom of FIG. 2A, air is directed from inlet plenum 42 to outlet plenum 44 through channel 45, opening 52 and enclosed portion 54 of valve member 46 without passing through first stage turbine 18, shown in FIG. 2.

Piston 48 has a substantially I-shaped cross section thereby defining a ring shaped cavity 56 between it and housing 50. Piston 48 therefore includes two end plates having oppositely disposed faces 57a and 57b, wherein the oppositely disposed faces and the ring shaped cavity allow for the formation of substantially balanced air pressures on the ends of piston 48, thereby easing movement of the piston in housing 50. The ring shape cavity 56 allows for air flow around and under piston 48 resulting in less turbulence, less pressure drop, and a more flow through volume. Valve member 46 is actuated via a linkage 58, which linkage 58 is connected to a rotating shaft 60, which shaft 60 is driven by a motor 62 and gear train 64. Accordingly, motor 62 is connected with and drives gear train 64, which gear train 64 engages rotatable shaft 60 for rotating the same. Gear ratios are selected to acquire the desired shaft rotation for moving valve member 46 into the open and closed position at the desired speed. A manual wrenching knob 66 is connected with gear train 64 for actuating the same should motor 62 cease to function or should other problems arise. A position indicator 68 is connected with rotating shaft 60 and extends outside of the air cycle machine housing for manual observation of the position of valve member 46.

Linkage 58 is comprised of crank arm 70 and link 72. Crank arm 70 extends substantially perpendicularly from rotating shaft 60. Accordingly, as shown in FIG. 5 via the normal and phantom lines, as shaft 60 rotates, end 74 of crank arm 70 travels in a circular path 76. Link 72 is pivotally connected at one end 78 to piston 48 and at the other end 80 to end 74 of crank arm 70. Accordingly, as end 74 is caused to move in the circular path 76 via its connection with rotating shaft 60, link 72 and piston 48 move in an oscillating manner, i.e. back and forth in housing 50 of valve member 46 for exposing and blocking opening 52 to outlet plenum 44. By way of this oscillating motion, valve member 46 is moved into the closed and open position as shown in the top and bottom halves of valve member 46, respectively, in FIG. 2A.

Figure 6:
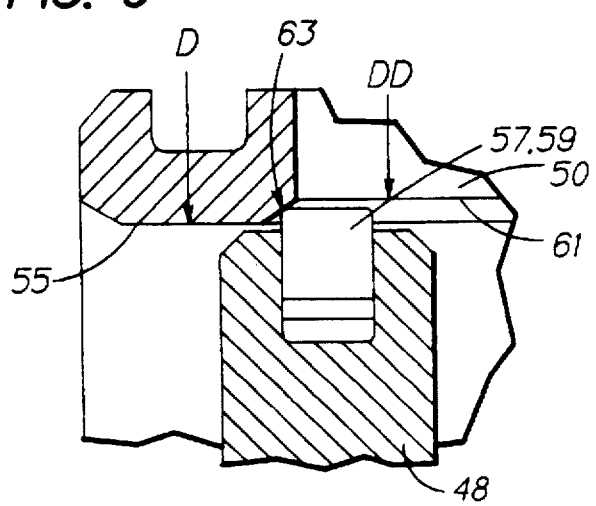
FIG. 6 is an enlarged view of area 6 shown in FIG. 5.

The clearance between the outer surfaces of piston 48 and the inner surface of housing 50 is sealed from air flow therethrough via the use of piston ring seals 57 and 59, as shown in FIG. 5 and FIG. 6. Only ring 57 is shown in FIG. 6, it being understood that the following description applies equally to ring seal 59. The inner surface of housing 50 includes a closure surface 55 at both ends thereof. The closure surface has an inner diameter D. The inner surface further includes a travel surface 61 having an inner diameter DD. Diameter D is smaller than diameter DD and is sized so as to compress ring seals 57 and 59 between their seating grooves in the outer surface of piston 48 and the inner surface of housing 50 for creating a tight closure seal while in the closed position. While piston 48 is moving on the travel surface 61 of diameter DD a looser fit is provided in the vicinity of the seals so as to ease movement of the piston. To ease the transfer of piston 48 from diameter DD to diameter D upon closure, a chamfer C is provided at the transitional area 63 on the inner surface. Accordingly, the inner seals are gradually compressed into closure with closure surfaces 55.

Figure 1A:
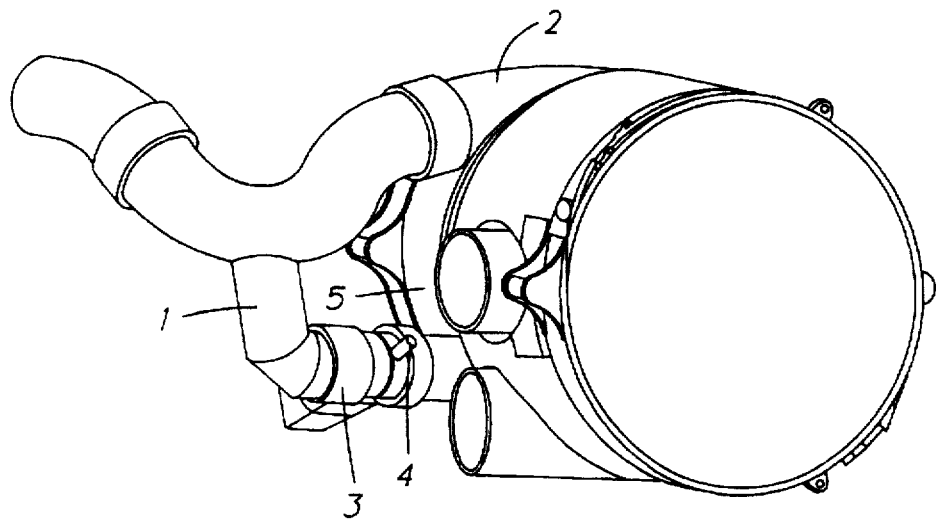
FIGS. 1A, 1B and 1C are perspective views of a prior art bypass systems for achieving radial turbine bypass, axial turbine bypass, and compressor bypass, respectively.
Figure 1B:
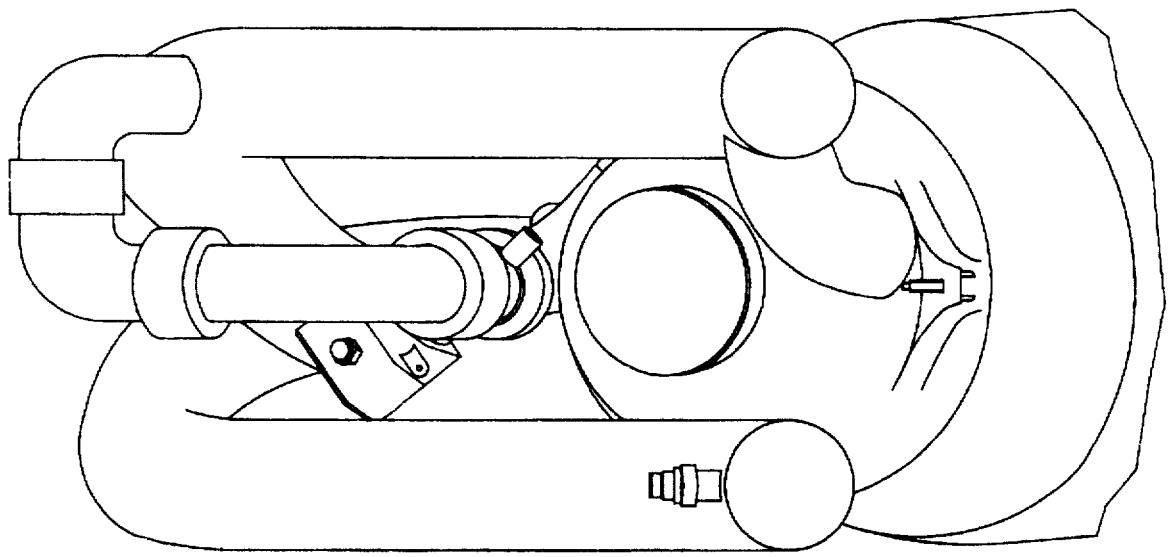
Figure 1C:
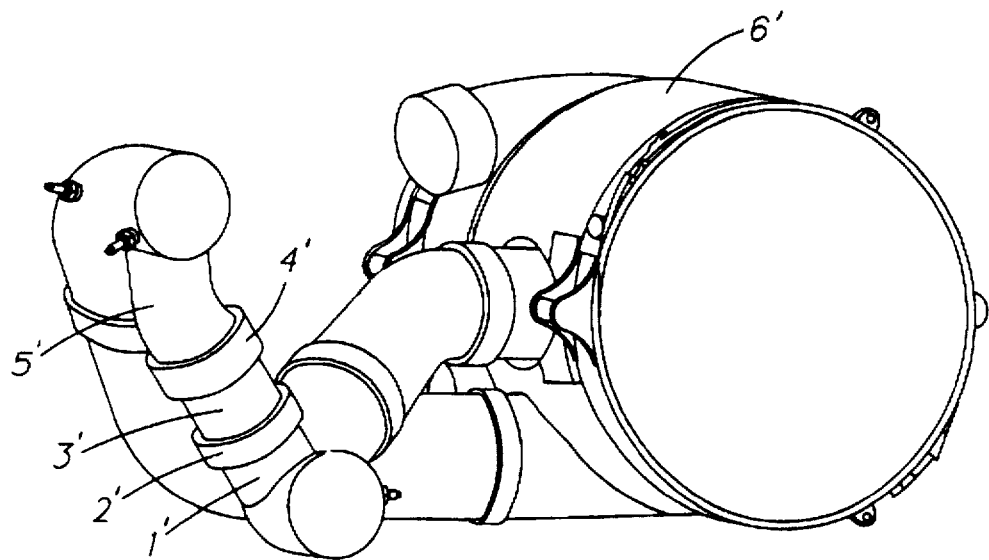

Radial bypass valve 12 is connected with ACM 10 as shown throughout FIGS. 2A, 4 and 5. That is, in referring to these figures, radial valve 12 includes an outer housing 82 having a flange 84 which mates with housing 22 of the ACM for maintaining housing 50 of valve member 46 inserted into the bypass port 30 of first stage turbine 18. Accordingly, fasteners 86, as shown in FIG. 4, are used to fasten radial bypass valve 12 to housing 22 of ACM 10. With valve 12 connected to housing 22 of the ACM, valve member 46 of radial valve 12 is disposed entirely in the first stage turbine housing 38, while only housing portion 82 and the actuator including motor 62 and gear train 64 are outside of housing 22, and channel 45 fluidically connects inlet 42 with valve member 46. By this arrangement, and as compared to the external radial bypass system of the prior art as shown in FIG. 1, substantially less material and duct work is required external to housing 22, thereby reducing the overall volume and space occupancy attributed to the ACM.

Referring to the figures, in operation of radial bypass 12, and as installed as shown in FIGS. 2A, 4, and 5, valve 12 functions to send a portion of air from inlet plenum 42 to outlet plenum 44, bypassing turbine 18. A temperature sensor (not shown) is provided downstream of the first stage turbine bypass port 30, which provides temperature information to a controller (not shown). In accordance with the temperature information sensed, the controller commands motor 62 to activate gear train 64 and linkage 58 for moving valve member 46 into the open or closed position, as is appropriate for adjusting temperature downstream. Accordingly, in the open position as shown in the bottom portion of FIG. 2B, and as shown by solid lines of FIG. 4, air flows from inlet plenum 42, through channel 45, past piston 48, into outlet plenum 44, and bypasses first stage turbine 18. The air then mixes with other air which does not bypass the turbine and in accordance with the temperature differential between the mixing airs, the air temperature desired in the outlet plenum 44 is adjusted.

Figure 7:
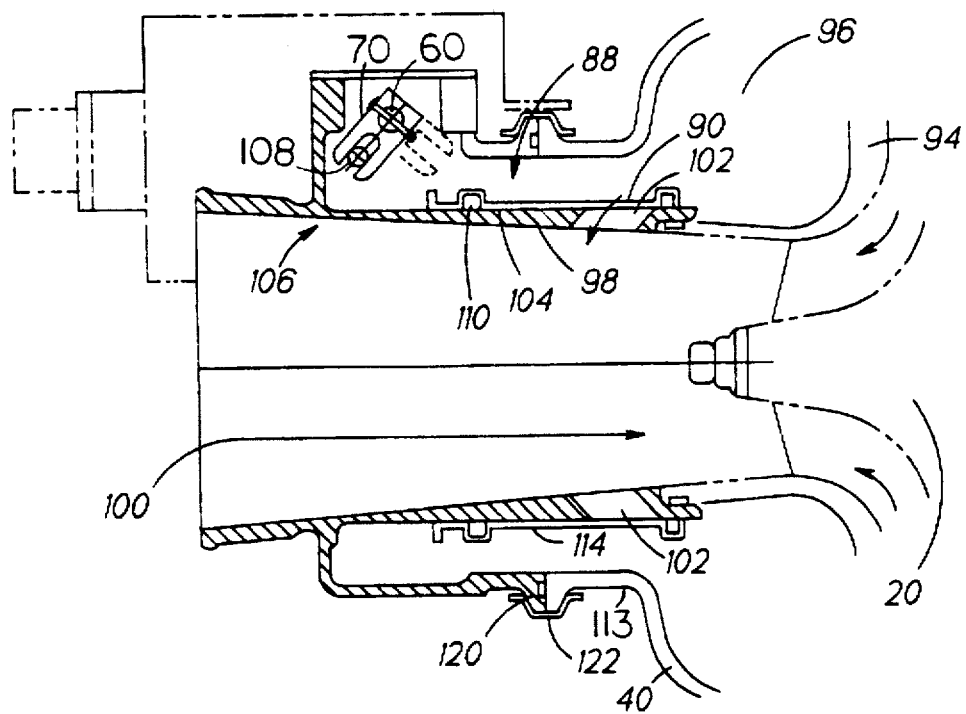
FIG. 7 is a partially cross-sectional view of the axial bypass valve positioned in the second turbine section, and taken along line 7—7 of FIG. 2, in accordance with the principles of the present invention.
Figure 8:
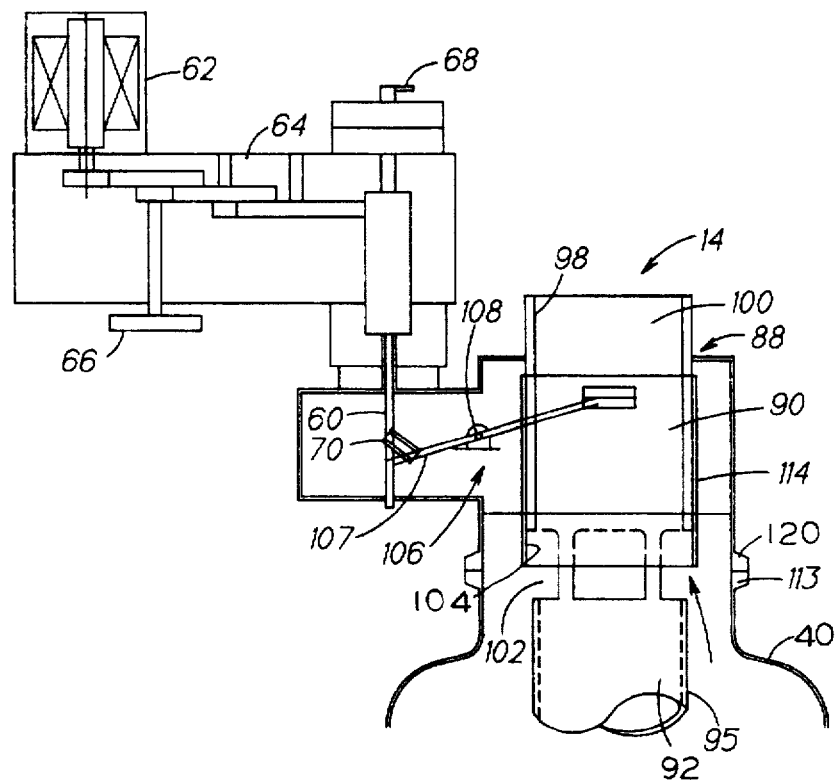
FIG. 8 is a functional schematic of an axial turbine bypass valve in accordance with the principles of the present invention.

A second embodiment of the turbine bypass valve of the present invention, i.e. axial bypass valve 14, is shown in the assembly position in FIG. 2, the partially cross-sectional view shown of FIG. 7, and in the schematic view shown of FIG. 8. The motor, gear train, rotating shaft, wrenching knob and position indicator, as well as the crank arm, for actuating the valve, are substantially the same as described above for radial bypass valve 12, and accordingly, are not further described hereafter but are referred to by similar reference numerals. The linkage and actual valve member in axial bypass valve 14 are different and are described as follows. In addition to the valve member and linkage, axial valve 14 is preferably used in the second stage turbine 20 and is designed to be axially positioned on the air cycle machine 10, as shown in FIG. 2, which is also further described below.

Figure 9:
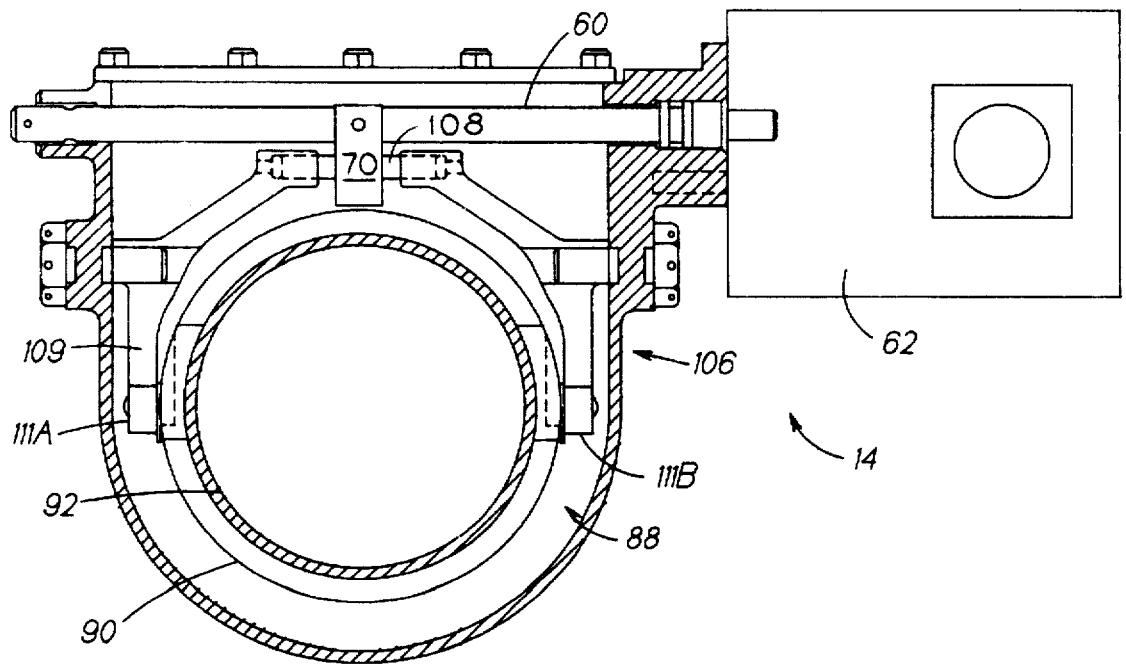
FIG. 9 is a cross-sectional view of the axial turbine bypass valve shown in FIG. 8, taken along line 9—9 of FIG. 2.

Referring to FIGS. 7–9, valve 14 is comprised of a valve portion 88, preferably in the form of a spool valve, which includes a sliding, substantially ring-shaped valve piston 90 which is reciprocal on a rod 92. Rod 92 is hollow in structure or cylindrical in shape and functions as a piston guiding extension of turbine shroud 94 and a housing for mating with the axial turbine outlet, as shown in FIG. 8. The outside surface 95 of rod 92 is adjacent the inlet plenum 96 of second stage turbine 20 and the inside surface 98 thereof is adjacent the outlet plenum 100 of second stage turbine 20. Rod 92 includes a plurality of entrance openings 102 extending from outside surface 95 to inside surface 98 such that in the open position of valve member 88, air flows directly from inlet plenum 96 to outlet plenum 100, thereby bypassing second stage turbine 20. In the closed position, air circulates against outside surface 95 but since entrance openings 102 are not exposed, the air does not bypass the second stage turbine 20 and therefore is directed therethrough, as indicated by the arrows. Valve piston 90 is moveable on outside surface 95 of valve rod 92 so as to cover and expose openings 102 for closing and opening axial valve 14. Accordingly, valve piston 90 preferably has a cylindrical shape with an inner surface 104 which conforms to the outside surface 95 of rod 92. By way of motor 62, gear train 64, rotating shaft 60, crank arm 70, and linkage 106, valve piston 90 is moved on outside surface 95 of rod 92 to open and close axial bypass valve 14. As shown in FIG. 8 and 9, linkage 106 is preferably in the form of an off center pivoting lever 107 attached to a wishbone or U-shaped linkage 109, which straddles piston 90. Upon the angular movement of crank arm 70, lever arm 107 and wishbone linkage 109 are caused to pivot on pivot 108, pulling and pushing at balance points 111A and 111B on piston 90, and thereby oscillating valve piston 90 to the open and closed position. Accordingly, openings 102 are exposed and covered for opening and closing, respectively, axial valve 14. Valve piston 90 is air sealed with respect to rod 92 by way of seals 110 and 112, as shown in FIG. 7. Axial valve 14 is connected to an external wall portion 113 of housing 40 via a flange 120 and fasteners 122, in a manner similar to as described above for radial bypass valve 12, as shown in FIG. 7. By way of fasteners 122, it can be easily disconnected for service, replacement or maintenance.

In operation of axial valve 14, a similar controller and a temperature sensor as discussed above for radial valve 12 is used for controlling the opening and closing of axial valve 14. In fact, the same controller as that used for the radial valve is preferably used and a separate temperature sensor (not shown) is placed downstream of bypass port 34 of second stage turbine 20 to provide temperature feedback to the controller. Accordingly, based on the temperature sensed, axial valve 14 is opened and closed by way of movement of valve member 88 for allowing air to bypass the turbine and for blocking of the turbine by the air. Accordingly, if a temperature increase is required downstream of the second stage turbine outlet, as determined by the temperature sensor (not shown), the controller (not shown) commands motor 62 to actuate the gear train 64, to rotate shaft 60 to move crank arm 70, and thereby slide valve piston 90 to the open position, as shown in FIG. 8. To achieve the open position, valve piston 90 slides on rod 92, exposing openings 102, to allow air flow therethrough and thereby allow a portion of the air flowing into the second stage turbine system to bypass the second stage turbine and move directly to the outlet plenum 100. If, however, the downstream temperature sensor indicates to the controller that the temperature should be reduced or remain the same, the motor, gear train, rotatable shaft and crank arm are moved to slide valve piston 90, via linkage 107 and 109, in the opposite direction for covering openings 102, if the openings are not already covered. In this arrangement, air will flow against the outside surface 114 of valve piston 90 and then into second stage turbine 24 for expansion and cooling.

Figure 10:
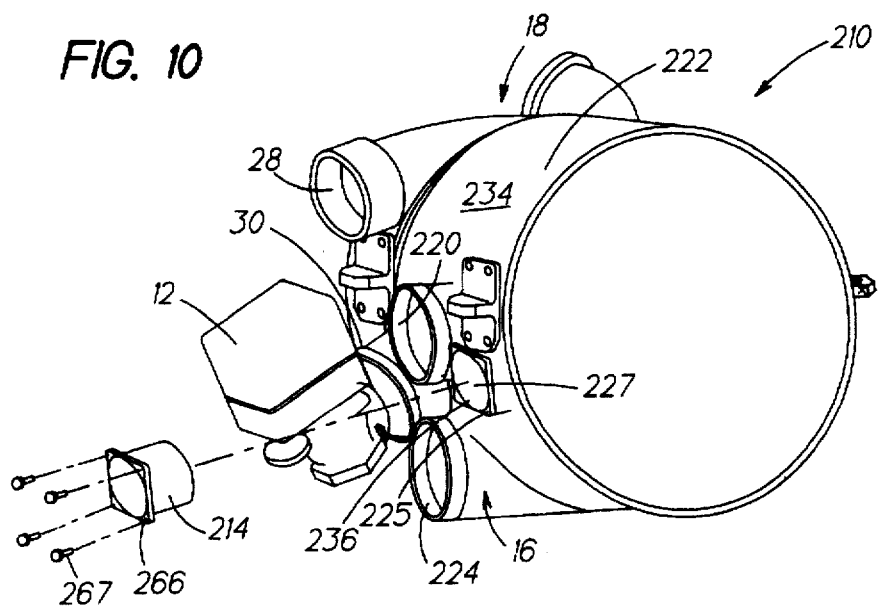
FIG. 10 is a perspective and partial assembly view of the compressor bypass system of the present invention, including a compressor bypass check valve shown in position for assembly with an ACM.
Figure 10A:
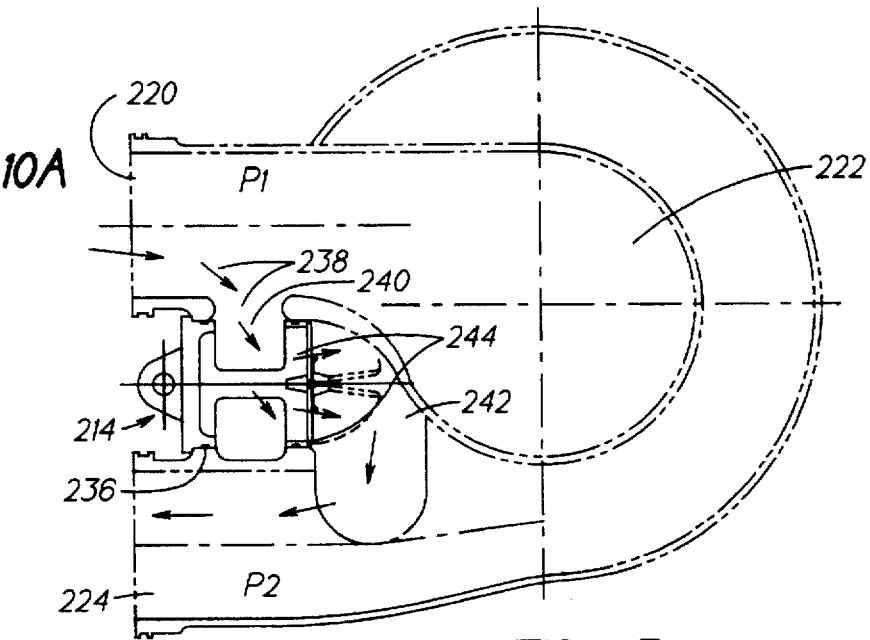
FIG. 10A is a partially cross-sectional view of the compressor portion of an ACM in accordance with the principles of the present invention, taken along line 10A—10A of FIG. 10, showing a compressor bypass check valve installed between the compressor inlet and the compressor outlet of the compressor portion.

For the embodiment of the compressor bypass valve 214, reference is made to FIG. 10, showing a reverse angle of ACM 10 of FIG. 2 with compressor bypass check valve 214, and FIG. 10A, wherein compressor system 16 includes an inlet 220 for receiving air from a source such as a gas turbine engine (not shown), a compressor 222 to which the air from the inlet is directed for compression, and air outlet 224 for expelling compressed air from compressor 222. Compressor housing portion 234 includes a bypass port 236 between air source inlet 220 and outlet 224, wherein bypass valve 214, described in detail below, extends from an outermost surface 225 of housing 234 into an internal volume 227 defined by an innermost wall of the housing 234. Compressed air from air outlet 224 is directed to turbine portion 16, which includes the turbine inlet 28, a turbine, and a turbine bypass port 30, shown in FIG. 2. Accordingly, air is directed from outlet 224 of compressor 222 to the turbine inlet 28 wherein the air is then directed through the rotating turbine blades where the air is expanded and cooled. The energy extracted in the turbine blade section from the compressed air is used to drive compressor 212 and fan. As a result, cooled air is output from a turbine outlet (not shown) and subsequently to a crew, passenger or otherwise occupied enclosure or cabin.

Referring now to the cross-sectional view of compressor system 16 including bypass valve 214 of FIG. 10, it can be seen that bypass valve 214 is positioned between compressor air source inlet 220 and air outlet 224 in bypass port 236. Accordingly, bypass port 236 comprises compressor housing portion 234 including an opening therein which receives bypass valve 214. As shown in FIG. 10A, with bypass valve 214 installed in compressor housing portion 234, a first passageway 238 is provided for directing air from inlet 220 to an entrance opening 240 of bypass valve 214. In addition, a second passageway 242 is formed for directing air exiting compressor 222 against an exit opening 244 of bypass valve 214. Accordingly, if the air pressure $P_1$ at air source inlet 220 is greater than air pressure $P_2$ at air outlet 224, then, as described in detail below, bypass valve 214 is moved into the open position whereby air travels from inlet 220 through the first passageway 238, through entrance opening 240 and exit opening 244 and finally through second passageway 242 into outlet 224. In this manner, excess pressure drop between inlet 220 and outlet 224 is connected.

Figure 11A:
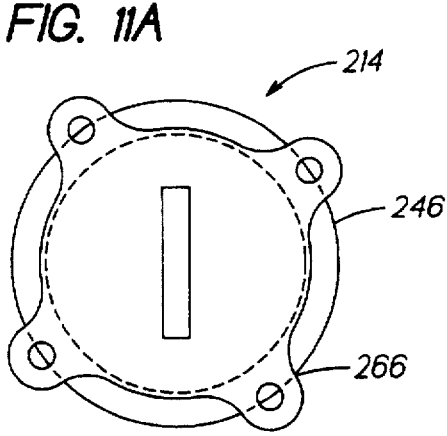
FIGS. 11A and 11B show a front and side, partially cross-sectional views, respectively, of a compressor bypass check valve, in accordance with the principles of the present invention.
Figure 11B:
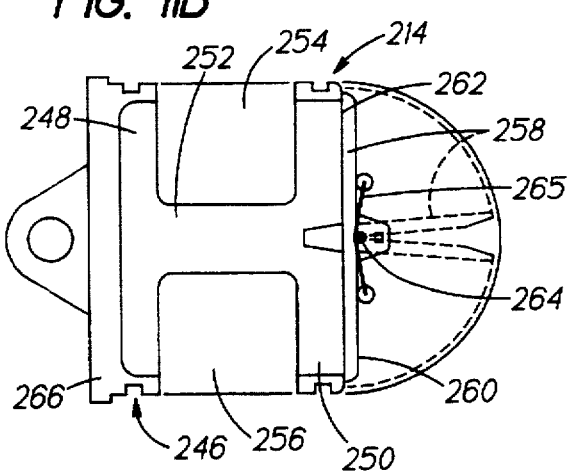

Referring now to FIGS. 11A and 11B, bypass valve 214 is described in detail. Bypass valve 214 includes a body or housing portion 246 having a substantially I-shaped cross section and which includes a first end comprising plate 248 and a second end comprising plate 250. Preferably, each of the first and second end plates are circular in shape as indicated in FIG. 11A. First end plate 248 and second end plate 250 are connected by intermediate support 252. Ring shaped cavity 254 is formed around intermediate support 252 and is further defined by the inner walls of the first and second end plate and intermediate support 252.

Ring shaped cavity 254 forms an integral portion of first and second passageways 238 and 242, respectively, as shown in FIG. 10A. For the valve portion of bypass valve 214, flaps or baffles 258 and 260 are positioned on the outer surface 262 of the second end plate 250. Flaps 258 and 260 are pivotally connected to second end plate 250 via a pin 264. As an optional feature, spring 265 provides pressure against flaps 258 and 260 such that they are lightly biased in the closed position. This pressure is enough to simply maintain closure in situations where light pressure may be necessary, such as if the orientation of the ACM is such gravity causes the flaps to open. Flaps 258 and 260 are free to pivot on pin 264 as a result of air pressure flowing against the entrance and exit sides thereof, which in the case of the entrance side must overcome the force of biasing spring 265 and pressure $P_2$, and in the case of the exit side must overcome pressure $P_1$, to actuate the flaps open and closed, respectively. Accordingly, and as described above, if pressure $P_1$ at air inlet source 220 is greater than pressure $P_2$ at air outlet 224 and the minimal closure force of spring 265, if used, flaps 258 and 260 pivot substantially parallel to air flow as indicated by the dotted lines in FIG. 11B. Alternatively, if pressure $P_2$ is greater than pressure $P_1$ then flaps 258 and 260 and valve 214 remain closed, as indicated by the solid lines of FIG. 11B.

Bypass valve 214 is connected to or mated with compressor housing portion 234 via a flange 266 adapted to receive a plurality of fasteners 267 for fastening the same against the housing, as shown in FIG. 10 and 11A. As can be seen from FIG. 10, by this connection and the positioning of bypass valve 214 within port 236 of housing 234, bypass valve 214 does not substantially contribute to the volume of space occupied by the air cycle machine 210. Accordingly, substantial space savings is achieved by using the bypass valve 214 of the present invention with air cycle machine 210. In addition, since bypass valve 214 is connected to compressor housing portion 234 via a plurality of fasteners, bypass valve 214 can be easily removed for maintenance replacement, and other reasons.

In operation, with bypass valve 214 secured in port 236 of compressor housing portion 234, the air cycle machine receives air from a source (not shown) via inlet 220. Under normal operations, the pressure $P_1$ of air entering air source inlet 220 is substantially lower than the pressure of the air exiting compressor 222, through outlet 224. Under these conditions, flaps 258 and 260 are kept closed against second end plate 250 for closing bypass valve 214. Biasing spring 265 assists in maintaining closure in certain situations, such as during ACM orientations which may cause the flaps to open prematurely. Due to modulation of air flow through downstream turbines such as through turbine system 16, the pressure $P_1$ of the air entering air source inlet 220 can be greater than the pressure $P_2$ of the air exiting compressor 222 through air outlet 224 and the minimal biasing force of spring 265. In this scenario, bypass valve 214 is caused to open via the higher pressure air acting against flaps 258 and 260 overcoming pressure $P_2$ at air outlet 224. Accordingly, air will flow through cavity 254 of bypass valve 214 and mix with the air at pressure $P_2$, exiting compressor 222. In this manner, the pressure drop across compressor 222 is controlled, and eventually pressures $P_1$ and $P_2$ are equalized, and finally enter the realm of normal operation, as described above. Also in this manner, when air is bypassed through bypass valve 214 prior to getting to compressor 222, and is exhausted downstream of a diffuser (not shown) so that the aerodynamic efficiency of the compressor is unaffected.

A primary advantage of this invention is that an ACM component bypass system is provided for use with an air cycle machine, which bypass system is substantially internally positioned within the air cycle machine and is easily accessible for removal, adjustment, replacement, maintenance, or for other purposes which may arise. Another advantage of this invention is that at least one of a turbine and compressor bypass system is provided which substantially eliminates the use of exterior interconnecting ducts, clamps, and seals, associated with current bypass systems, and which is easily accessible for removal from the air cycle machine. Still another advantage of this invention is that at least one of a turbine and compressor bypass system is provided which does not disrupt the aerodynamics of the air cycle machine. And another advantage of this invention is that at least one of a turbine and compressor bypass system is provided in the form of a substantially internally positioned bypass valve so as to maintain the volume of space occupied by the air cycle machine at substantially the volume of the air cycle machine housing. A further advantage of this invention is that at least one of a turbine and compressor bypass system in the form of a substantially internally positioned bypass valve is provided, which system is easily removable and replaceable as an LRU.

Although the invention has been shown and described with respect to the best mode embodiments thereof, it should be understood by those skilled in the art that the foregoing and various other changes, omissions, and additions in the form and detail thereof may be made without departing from the spirit and scope of the invention.

We claim:

1. A bypass valve for use with a component of an air cycle machine, wherein said component includes a conditioning member, an inlet and an outlet and said air cycle machine includes a component housing portion, said component housing portion defining a first volume and including means for receiving said valve, comprising:

means for mating with said means for receiving;

an air entrance opening adapted to be positioned adjacent said inlet;

an air exit opening adapted to be positioned adjacent said outlet; and valve means for controlling at least one of temperature and pressure of said air at said outlet by permitting air flow from said entrance opening to said exit opening and bypassing said conditioning member and by prohibiting air flow from said entrance opening to said exit opening for directing substantially all of said air into said conditioning member, wherein said valve means is adapted to be substantially entirely positioned inside of said first volume in said means for receiving.

2. The bypass valve according to claim 1, further including means for actuating said valve means to an open position where bypass air flows therethrough and bypasses said conditioning member and to a closed position where said bypass air is b locked from entering said entrance opening.

3. The bypass valve according to claim 2, wherein said conditioning member comprises a turbine, said inlet comprises a turbine inlet, and said outlet comprises a turbine outlet, wherein said means for actuating comprises a linkage connected with said valve means for moving said valve means for opening and closing said entrance opening.

4. The bypass valve according to claim 3, wherein said linkage comprises a rotating shaft connected with a crank arm, wherein said crank arm is further connected with said valve means such that upon rotation of said shaft, said crank arm is angularly displaced relative said valve means for achieving actuation of said valve means.

5. The bypass valve according to claim 4, wherein said crank arm is connected to said valve means via a pivoting lever.

6. The bypass valve according to claim 3, wherein said means for actuating further comprises a motor and gear train connected with said linkage for moving said linkage to open and close said entrance opening.

7. The bypass valve according to claim 1, wherein said valve means comprises a member which is reciprocal for opening and closing said entrance opening.

8. The bypass valve according to claim 7, wherein said conditioning member comprises a turbine, said inlet comprises a turbine inlet, and said outlet comprises a turbine outlet, wherein said slidable member comprises a piston slidable in a housing relative said turbine inlet, said entrance opening is adapted to be exposed to said turbine inlet for opening said valve and blocked from said turbine inlet for closing said valve.

9. The bypass valve according to claim 8, wherein said piston includes oppositely disposed faces and means for balancing air pressure on said oppositely disposed faces for easing movement of said piston in said housing.

10. The bypass valve according to claim 8, wherein said piston comprises a ring slidable on a guiding member, wherein said guiding member includes a plurality of entrance openings over which said ring is slidable for exposing said entrance openings to air flowing in said turbine inlet for opening said bypass valve and for blocking said entrance openings from air flowing in said turbine inlet for closing said bypass valve.

11. The bypass valve according to claim 7, wherein said means for mating and said valve means are adapted to be radially positioned relative said turbine outlet.

12. The bypass valve according to claim 7, wherein said means for mating and said valve means are adapted to be axially positioned relative said turbine outlet.

13. The bypass valve according to claim 1, further including means for connecting and disconnecting said valve means with said component housing portion for allowing ease of removal of said valve means from said means for receiving.

14. The bypass valve according to claim 1, wherein said means for mating comprises a valve housing shaped to mate with said means for receiving, said valve housing adapted to be positioned substantially entirely in said first volume.

15. The bypass valve according to claim 14, wherein said means for receiving comprises an opening in said component housing portion, and wherein said valve housing comprises an outer wall shaped to mate with said opening.

16. The bypass valve according to claim 15, wherein said component housing portion includes an external wall, further comprising means for securing a portion of said valve housing to said external wall.

17. The bypass valve according to claim 16, wherein said means for securing comprises said valve housing including a flange for receiving fasteners for connecting said valve housing to said component housing portion.

18. The bypass valve according to claim 1, wherein said valve means comprises a plurality of movable flaps positioned between said entrance opening and said exit opening.

19. The bypass valve according to claim 18, wherein said plurality of movable flaps comprise at least two pivotal butterfly flaps connected to and pivotal relative said means for mating for opening and closing said exit opening.

20. A system for use in conditioning air designated for use in an occupied enclosure, comprising:

a compressor system including an air compressor, an air source inlet, and a compressed air outlet;

a turbine system including a turbine, a turbine inlet, a turbine outlet, wherein compressed air is fed from said compressed air outlet to said turbine inlet for expansion and cooling for use in driving said compressor and supplying conditioned air to said enclosure;

a housing including a compressor housing portion defining a first internal volume and a turbine housing portion defining a second internal volume; and at least one bypass valve means for use in bypassing air flow in at least one of said turbine system and said compressor system, said bypass valve means comprising means for mating with at least one of said turbine housing portion and said compressor housing portion, an air entrance opening adjacent at least one of said turbine inlet and said air source inlet, an air exit opening adjacent at least one of said turbine and compressed air outlets, and valve portion means for at at least one of controlling temperature and pressure of said air at at least one of said turbine outlet and compressed air outlet by permitting air flow from said air entrance opening to said air exit opening for bypassing at least one of said turbine and said compressor, wherein said valve portion means is positioned substantially entirely in at least one of said first and second internal volumes.

21. The system according to claim 20, wherein said turbine housing portion includes means for engaging said bypass valve means, said means for engaging having an axial orientation relative said turbine housing portion.

22. The system according to claim 21, wherein said bypass valve means is axially oriented in said means for engaging relative said turbine housing portion.

23. The system according to claim 20, wherein said turbine housing portion includes means for engaging said bypass valve means, said means for engaging having a radial orientation relative said turbine housing portion.

24. The system according to claim 23, wherein said bypass valve means is radially oriented in said means for engaging relative said turbine housing portion.

25. The system according to claim 20, further including means for actuating said valve portion means to an open position where bypass air flows therethrough and bypasses one of said turbine and compressor and to a closed position where said air is blocked from entering said entrance opening.

26. The system according to claim 25, wherein said means for actuating comprises a linkage connected with said valve portion means for moving said valve portion means for opening and closing said entrance opening.

27. The system according to claim 26, wherein said means for actuating further comprises a motor and gear train connected with said linkage for moving said linkage for opening and closing said entrance opening.

28. The system according to claim 20, wherein said valve portion means comprises a slidable member which is movable for opening and closing said entrance opening.

29. The system according to claim 20, further including means for removably connecting said bypass valve means to said turbine housing portion.

30. The system according to claim 29, wherein said means for removably connecting comprises said bypass valve means including a housing for receiving fastener means for fastening said bypass valve means to said turbine housing portion.

31. The system according to claim 20, wherein said compressor housing portion includes an outermost wall, an innermost wall defining said first volume, and a port positioned between said air source inlet and said compressed air outlet for receiving said bypass valve means.

32. The system according to claim 31, wherein said bypass valve means extends from said outermost wall into said interior, such that said valve portion means is positioned substantially entirely in said first internal volume of said compressor housing portion.

33. The system according to claim 31, wherein said means for mating comprises a bypass valve housing having a first end and a second end, wherein said bypass valve housing is positioned in said port of said compressor housing portion, such that said first end is positioned outside of said compressor housing portion and said second end is positioned in said first internal volume.

34. The system according to 20, where in said valve portion means comprises at least one movable flap positioned between said entrance opening and said exit opening.

35. The system according to claim 34, wherein said valve portion means comprises at least two pivotal butterfly flaps connected to and pivotal relative said means for mating.

36. The system according to claim 20, further including means for actuating said valve portion means.

37. The system according to claim 36, wherein said means for actuating comprises a first air passageway connecting said air source inlet to said air entrance opening and a second air passageway connecting said compressed air outlet to said air exit opening, and wherein said valve portion means includes an entrance side and an exit side, wherein when source air acting on said entrance side through said first air passageway has a lower pressure than air acting on said exit side through said second air passageway, said valve portion means is closed for prohibiting air flow through said bypass valve and when source air acting on said entrance side through said first air passageway has a higher pressure than air acting on said exit side through said second air passageway, said valve portion means is open for permitting air flow through said bypass valve, for controlling pressure differential.

38. The system according to 37, wherein said valve portion means comprises a plurality of movable flaps positioned between said entrance opening and said exit opening.

39. The system according to claim 38, wherein said plurality of movable flaps comprise at least two pivotal butterfly flaps connected and pivotal relative said means for mating.

40. The system according to claim 39, further comprising means for biasing said movable flaps closed.

41. The system according to claim 20, wherein said at least one bypass valve means comprises a compressor bypass valve for use with said compressor system, further including an internally positioned and removable turbine bypass valve means for use in bypassing air flow in said turbine system.

42. The system according to claim 41, wherein said turbine bypass valve means includes second means comprising means for mating with said turbine housing portion, a turbine air entrance opening adjacent said turbine inlet, an turbine air exit opening adjacent said turbine outlet, and turbine valve portion means for controlling temperature of said air at said turbine outlet by permitting air flow from said turbine air entrance opening to said turbine air exit opening for bypassing said turbine, wherein said turbine valve portion means is positioned substantially entirely in said second internal volume.

43. The system according to claim 42, wherein said turbine bypass valve means comprises a radial turbine bypass valve, further including a second turbine system including a second turbine, a second turbine inlet, a second turbine outlet, wherein air is fed from said turbine system to said second turbine inlet for further expansion and cooling for use supplying conditioned air to said enclosure and wherein said housing includes a second turbine housing portion defining a third internal volume, said second turbine system including an internally positioned and removable axial turbine bypass valve means for use in bypassing air flow in said second turbine system.

44. The system according to claim 43, wherein said axial turbine bypass valve means includes third means for mating with said second turbine housing portion, a second turbine air entrance opening adjacent said second turbine inlet, a second turbine air exit opening adjacent said second turbine outlet, and second turbine valve portion means for controlling temperature of said air at said second turbine outlet by permitting air flow from said second turbine air entrance opening to said second turbine air exit opening for bypassing said second turbine, wherein said second turbine valve portion means is positioned substantially entirely in said third internal volume.

* * * * *